US011327639B2

(12) United States Patent
Fu et al.

(10) Patent No.: US 11,327,639 B2
(45) Date of Patent: May 10, 2022

(54) SPLIT VIEW EXITING METHOD, SPLIT VIEW EXITING DEVICE, AND ELECTRONIC DEVICE (71) Applicant: GUANGDONG OPPO MOBILE TELECOMMUNICATIONS CORP., LTD., Guangdong (CN)

(72) Inventors: Liangjing Fu, Guangdong (CN); Zhiyong Lin, Guangdong (CN); Tongxi Li, Guangdong (CN); Dan Cao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/140,070

(22) Filed: Jan. 2, 2021

(65) Prior Publication Data
US 2021/0124480 A1 Apr. 29, 2021

Related U.S. Application Data (63) Continuation-in-part of application No. PCT/CN2019/085898, filed on May 7, 2019.

(30) Foreign Application Priority Data

Jul. 3, 2018 (CN) .......................... 201810720096.7

(51) Int. Cl.
*G06F 3/04845* (2022.01)
*G06F 3/0484* (2022.01)
(Continued)

(52) U.S. Cl.
CPC ........ *G06F 3/04845* (2013.01); *G06F 3/0484* (2013.01); *G06F 3/04886* (2013.01); *G06F 2203/04803* (2013.01)

(58) Field of Classification Search
CPC ............... G06F 3/04845; G06F 3/0484; G06F 3/04886; G06F 2203/04803; G06F 3/0488
See application file for complete search history.

(56) References Cited

U.S. PATENT DOCUMENTS 6,600,500 B1 * 7/2003 Yamamoto ............ G06F 3/0481
715/779
9,538,229 B2  1/2017 Xiao et al.
(Continued)

FOREIGN PATENT DOCUMENTS

CN    103793136    5/2014
CN    104793875    7/2015
(Continued)

OTHER PUBLICATIONS

SIPO, First Office Action for CN Application No. 201810720096.7, dated Aug. 28, 2019.
(Continued)

*Primary Examiner* — John T Repsher, III
(74) *Attorney, Agent, or Firm* — Hodgson Russ LLP (57) ABSTRACT

The embodiments of the disclosure provide a split view exiting method and device, a storage medium and an electronic device. The method includes: detecting, in a split view state, a moving operation from a user for a first split window and a second split window; moving the first split window and the second split window according to the detected moving operation; acquiring window overlap information of the first split window and the second split window when detecting that the first split window and the second split window are partially overlapped; and exiting the split view state when the window overlap information meets a preset split exiting condition.

19 Claims, 5 Drawing Sheets

(51) Int. Cl.
*G06F 3/04886* (2022.01)
*G06F 3/0488* (2022.01)

(56) References Cited

U.S. PATENT DOCUMENTS

| | | | |
|---|---|---|---|
| 9,588,674 | B2 | 3/2017 | Strutin-Belinoff et al. |
| 2008/0158189 | A1* | 7/2008 | Kim .................. G06F 3/04886 345/173 |
| 2008/0307352 | A1* | 12/2008 | Chaudhri ................ G06F 3/048 715/788 |
| 2013/0176232 | A1 | 7/2013 | Waeller |
| 2014/0075394 | A1 | 3/2014 | Nawle et al. |
| 2014/0164963 | A1 | 6/2014 | Klemenz et al. |
| 2014/0184526 | A1 | 7/2014 | Cho |
| 2015/0312508 | A1 | 10/2015 | Phang et al. |
| 2015/0325211 | A1* | 11/2015 | Lee ...................... G06F 3/0481 345/1.3 |
| 2016/0034159 | A1* | 2/2016 | Vranjes ............... G06F 3/04842 715/800 |
| 2017/0031555 | A1 | 2/2017 | Ma |

FOREIGN PATENT DOCUMENTS

| | | |
|---|---|---|
| CN | 104881266 | 9/2015 |
| CN | 105573639 | 5/2016 |
| CN | 106155559 | 11/2016 |
| CN | 106648314 | 5/2017 |
| CN | 107037949 | 8/2017 |
| CN | 108920086 | 11/2018 |
| WO | 2011142069 | 11/2011 |

OTHER PUBLICATIONS

SIPO, Second Office Action for CN Application No. 201810720096.7, dated Nov. 28, 2019.
SIPO, Third Office Action for CN Application No. 201810720096.7, dated Feb. 28, 2020.
SIPO, Notification to Grant Patent Right for Invention for CN Application No. 201810720096.7, dated May 29, 2020.
WIPO, ISR for PCT Application No. PCT/CN2019/085898, Aug. 7, 2019.
EPO, Extended European Search Report for EP Application No. 19830848.8, dated Jul. 15, 2021.

* cited by examiner

SPLIT VIEW EXITING METHOD, SPLIT VIEW EXITING DEVICE, AND ELECTRONIC DEVICE

CROSS REFERENCE TO RELATED APPLICATION

This application is a continuation-in-part of International Application No. PCT/CN2019/085898, filed May 7, 2019, which claims priority to Chinese Patent Application No. 201810720096.7, filed Jul. 3, 2018, the entire disclosures of which are incorporated herein by reference.

TECHNICAL FIELD

The present disclosure relates to the field of electronic device technologies, and more particularly, to a split view exiting method and device, a storage medium, and an electronic device.

BACKGROUND

With the development of technology, the terminal used to be a device for providing calls, and now it has become a platform for running software applications. However, providing calls is no longer the main purpose for the platform, the platform provides an operating environment for various software, including call management, game entertainment, office notes, mobile payment, etc., which have been popularized in all aspects of people's lives and work.

Split view is a relatively common user scenario for smart terminals in the Android system. Users pay attention to the experience when using the split-view, and have relatively high requirements for the speed of split view operation, the expressiveness of the display, the convenience of entry and exit, and the humanity. The fluency of operation processes also affects the user experience. The user's performance and intuitive experience of the terminal will be associated with the operations of the split view, thereby affecting the brand and reputation of the terminal.

SUMMARY

The disclosure provides a split view exiting method, a split view exiting device, a storage medium, and an electronic device, capable of improving the efficiency of exiting the split view.

In a first aspect, embodiments of the disclosure provide a split view exiting method. The method includes:
detecting, in a split view state, a moving operation from a user for a first split window and a second split window;
moving the first split window and the second split window according to the detected moving operation; acquiring window overlap information of the first split window and the second split window when detecting that the first split window and the second split window are partially overlapped; and
exiting the split view state when the window overlap information meets a preset split exiting condition.

In a second aspect, embodiments of the disclosure further provide a split view exiting device. The device includes:
a detection module, configured for detecting, in a split view state, a moving operation from a user for a first split window and a second split window;
a moving module, configured for moving the first split window and the second split window according to the detected moving operation;
an information acquisition module, configured for acquiring window overlap information of the first split window and the second split window when detecting that the first split window and the second split window are partially overlapped; and
an exit processing module, configured for exiting the split view state when the window overlap information meets a preset split exiting condition.

In a third aspect, embodiments of the disclosure further provide a storage medium, having a computer program stored therein. When the computer program is executed by a processor, the above split view exiting method is performed.

In a fourth aspect, embodiments of the disclosure further provide an electronic device. The electronic device includes a memory, a processor and a computer program stored in the memory and executable by the processor. When the processor executes the computer program, steps of the above split view exiting method are performed.

BRIEF DESCRIPTION OF THE DRAWINGS

In order to more clearly describe the technical solutions of the disclosure, the following briefly introduces the drawings needed to be used in the description of the embodiments. Obviously, the drawings in the following description only illustrate some embodiments of the disclosure, and other drawings can be obtained for those skilled in the art, based on these drawings without creative work.

DETAILED DESCRIPTION OF PREFERRED EMBODIMENTS

The same reference numeral in the drawings represent the same component, and the principle of the disclosure is illustrated by being implemented in an appropriate computing environment for illustration. The following description is based on the exemplified specific embodiments of the disclosure and should not be regarded as limiting other embodiments that are not illustrated herein.

The principle of the disclosure uses many other computation system, communication environments or configurations, with general purpose or specific purpose, to execute. Well-known examples of computing systems, environments, and configurations suitable for use in this disclosure may include (but are not limited to) handheld phones, personal computers, servers, multi-processor systems, microcomputer-based systems, main architecture computers, and distributed computing environments which include any of the above systems or devices.

Embodiments of the disclosure provides a split view exiting method, which includes the following steps:
detecting, in a split view state, a moving operation from a user for a first split window and a second split window;
moving, according to the detected moving operation, the first split window and the second split window;
acquiring window overlap information of the first split window and the second split window when detecting that the first split window and the second split window are partially overlapped; and
exiting the split view state when the window overlap information meets a preset split exiting condition.

In some embodiments, the window overlap information includes a window overlap area, and the step of exiting the split view state when the window overlap information meets a preset split exiting condition includes: exiting the split view state when the window overlap area is greater than a preset area.

In some embodiments, the window overlap information includes a window overlap length, and the step of exiting the split view state when the window overlap information meets a preset split exiting condition includes: exiting the split view state when the window overlap length is greater than a preset length.

In some embodiments, the window overlap information includes an area ratio of a window overlap area to the area of the first split window, and the step of exiting the split view state when the window overlap information meets a preset split exiting condition includes: exiting the split view state when the area ratio is greater than a preset ratio.

In some embodiments, the step of exiting the split view state includes: determining a target application, from a first application displayed on the first split window and a second application displayed on the second split window, wherein the target application remains displayed after exiting the split view state; and exiting the split view state and displaying the target application.

In some embodiments, the step of determining a target application, from a first application displayed on the first split window and a second application displayed on the second split window includes: acquiring a first window size of the first split window and a second window size of the second split window; selecting, according to the first and the second window size, a target split window from the first and the second split window; and taking the application displayed on the target split window as the target application that remains displayed after exiting the split view state.

In some embodiments, the step of selecting, according to the first and the second window size, a target split window from the first and the second split window, includes: selecting the first split window as the target split window when the first window size is greater than the second window size.

In some embodiments, the step of determining a target application, from a first application displayed on the first split window and a second application displayed on the second split window includes: acquiring first position information of the first split window and second position information of the second split window; selecting, according to the first and the second position information, a target split window from the first and the second split window; and taking the application displayed on the target split window as the target application that remains displayed after exiting the split view state.

In some embodiments, the step of determining a target application, from a first application displayed on the first split window and a second application displayed on the second split window comprises: acquiring a first area of an unoverlapped portion of the first split window, and acquiring a second area of an unoverlapped portion of the second split window; selecting, according to the first area and the second area, a target split window from the first and the second split window; and taking the application displayed on the target split window as the target application that remains displayed after exiting the split view state.

In some embodiments, the step of acquiring window overlap information of the first split window and the second split window when detecting that the first split window and the second split window are partially overlapped comprises: detecting whether an overlapped portion is formed by moving the first and the second split window; updating the size of the overlapped portion until the size of the overlapped portion remains unchanged within a preset time length; and taking the latest updated size of the overlapped portion as the window overlap information. The preset time length can be set according to actual requirements or user habits, for example, the preset time length is in the range of 0.5-2 seconds. When the preset time length is set as 0.5 seconds, the size of the overlapped portion is stopped to update if the size of the overlapped portion remains unchanged within 0.5 seconds. The size of the overlapped portion remains unchanged when the moving operation stays, in other words, the size of the overlapped portion remains unchanged when the first and the second split window stop moving. The overlapped portion is formed when at least a part of the first split window is overlapped with at least a part of the second split window.

In some embodiments, after the step of moving the first split window and the second split window according to the detected moving operation, the method further comprises: detecting whether an overlapped portion is formed by moving the first and the second split window; wherein the window overlap information comprises the area of the overlapped portion, the length of the overlapped portion, and the ratio of the area of the overlapped portion to the area of the first split window;
wherein the step of exiting the split view state when the window overlap information meets a preset split exiting condition comprises: exiting the split view state when any one of the area of the overlapped portion, the length of the overlapped portion, and the ratio of the area of the overlapped portion to the area of the first split window is greater than a corresponding threshold. That is, the electronic device defines a corresponding area threshold, when the area of the overlapped portion is greater than the area threshold, the split view state is exited. The electronic device defines a corresponding length threshold, when the length of the overlapped portion is greater than the length threshold, the split view state is exited. The electronic device also defines a corresponding ratio threshold, when the ratio is greater than the ratio threshold, the split view state is exited.

In some embodiments, the step of exiting the split view state when the window overlap information meets a preset split exiting condition comprises: determining a target split window from the first and second split windows; closing the other of the first and second split windows; and enlarging the target split window until the target split window is fullscreen.

In some embodiments, the step of exiting the split view state when the window overlap information meets a preset split exiting condition comprises: closing the second split window when the size of the first split window is greater than the size of the second spit window; and enlarging the first split window until the first split window is full screen.

In some embodiments, after the step of moving the first split window and the second split window according to the detected moving operation, the method further comprising: detecting whether an overlapped portion is formed by moving the first and the second split window; acquiring and updating the size of the overlapped portion as the first and the second split window move; acquiring and updating the size of an unoverlapped portion of the first split window as the first and the second split window move; and acquiring and updating the size of an unoverlapped portion of the second split window as the first and the second split window move; wherein the step of exiting the split view state when the window overlap information meets a preset split exiting condition comprises: closing the second split window when the latest updated size of the overlapped portion is greater than a size threshold and the latest updated size of the unoverlapped portion of the first split window is greater than the latest updated size of the unoverlapped portion of the second split window; and enlarging the first split window until the first split window is fullscreen.

It is noted that, the size of the unoverlapped portion is updated in real time until the size of the unoverlapped portion remains unchanged within the preset time length. The size of the unoverlappped portion remains unchanged refers to that the moving operation stays, or refers to that the first and the second split window stop moving.

In some embodiments, before the step of detecting, in a split view state, a moving operation simultaneously performed on a first split window and a second split window, the method further comprising: displaying the first split window, the second split window and a third split window on a screen, wherein the first, second and third split windows are adjacent to each other; wherein the operation of exiting the split view state when the window overlap information meets a preset split exiting condition comprises: closing the second split window and the third split window; and enlarging the first split window until the first split window is fullscreen.

Details will be described below.

The embodiment is described from a perspective of a split-screen exiting device, the device can be integrated in an electronic device, and the electronic device can be a mobile interconnection device (such as a smart phone and a tablet computer) and other devices with image processing functions.

Figure 1:
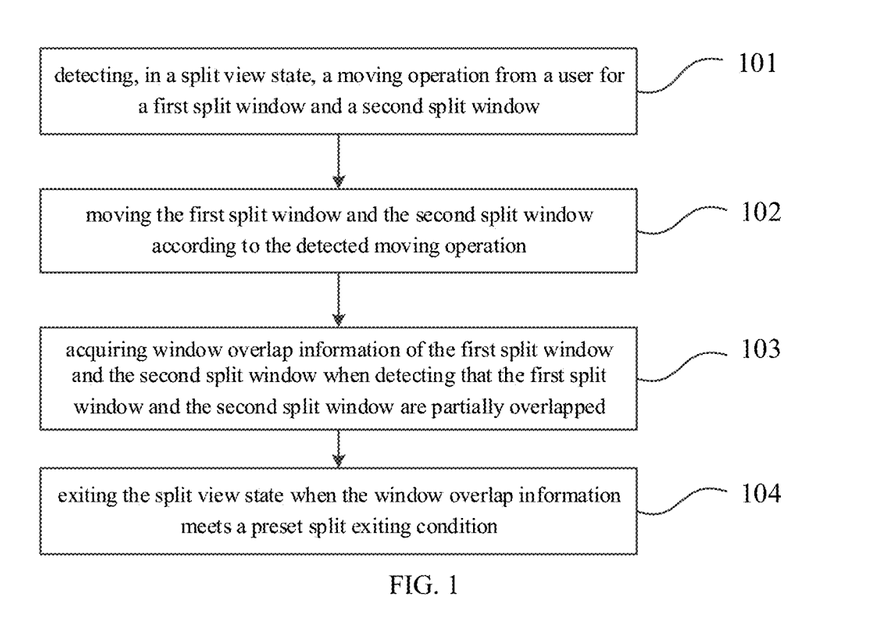
FIG. 1 is a schematic flowchart of a split view exiting method, according to an embodiment of the disclosure.

FIG. 1 illustrates a flowchart of a split view exiting method, which includes the following steps.

101, when in a split view state, a user's moving operation for a first split window and a second split window is detected.

When an electronic device is in the split view state, the electronic device displays more than one split windows, such as two, three, or more split windows. The position that each split window displayed on a screen can be set according to actual requirements, and each split window corresponds to an application program (hereinafter application for short).

In the embodiment, the positions of the split windows can be set according to actual needs, e.g., the split windows can be spaced apart from each other.

Figure 2:
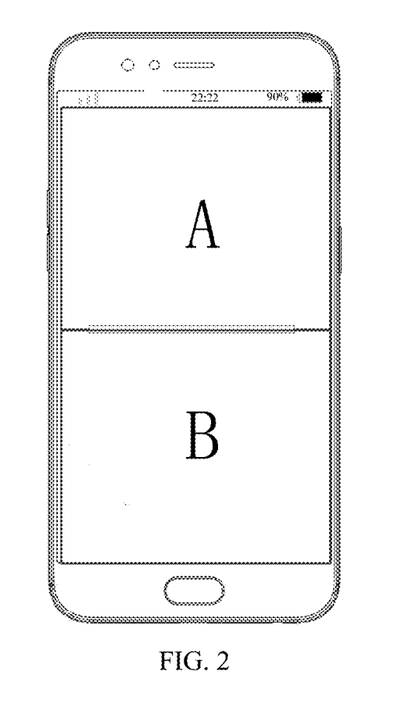
FIG. 2 is a schematic diagram of a split view, according to an embodiment of the disclosure.

For example, when the electronic device is in the split view state, two split windows can be displayed, that is, an upper split window and a lower split window can be displayed, as illustrated in FIG. 2. In another embodiment, two split windows can be displayed left and right. Referring to FIG. 2, the upper split window is configured for displaying an application A, and the lower split window is configured for displaying an application B.

The first split window and the second split window are any two split windows of the split windows in the split view state. For instance, the first split window may be the upper split window, and the second split window may be the lower split window, as shown in FIG. 2.

Figure 3:
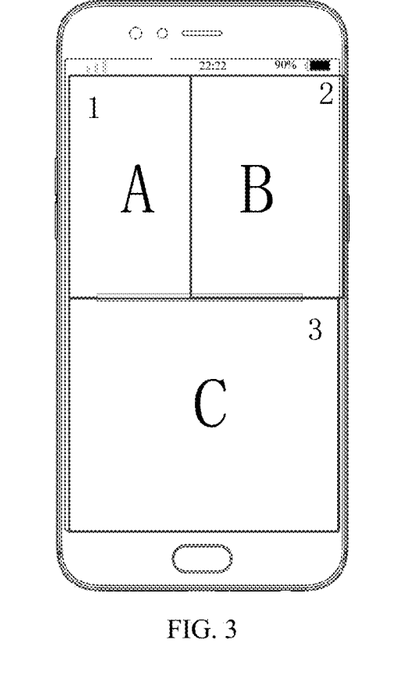
FIG. 3 is a schematic diagram of a split view, according to another embodiment of the disclosure.

For another example, when the electronic device is in the split view state, three split windows, i.e., split windows 1, 2, and 3, can be displayed, as illustrated in FIG. 3. The split windows 1, 2, and 3 are configured for displaying applications A, B, and C, respectively.

The moving operation refers to a user's operation for simultaneously moving both of the two split windows. For instance, the user uses two fingers to move the two split windows at the same time. The moving operation may include that the two split windows move toward each other.

In one embodiment, the electronic device detects the user's operation performed on the split windows in real time. For instance, the user performs a moving operation on the upper split window and the lower split window at the same time, as shown in FIG. 2. When the electronic device detects the moving operation, the electronic device can obtain relevant information about the moving operation, such as a moving direction, a moving track, a moving distance, and so on.

102, the first split window and the second split window are moved according to the detected moving operation.

For example, the first split window and the second split window are moved simultaneously, according to the detected moving operation.

Figure 4:
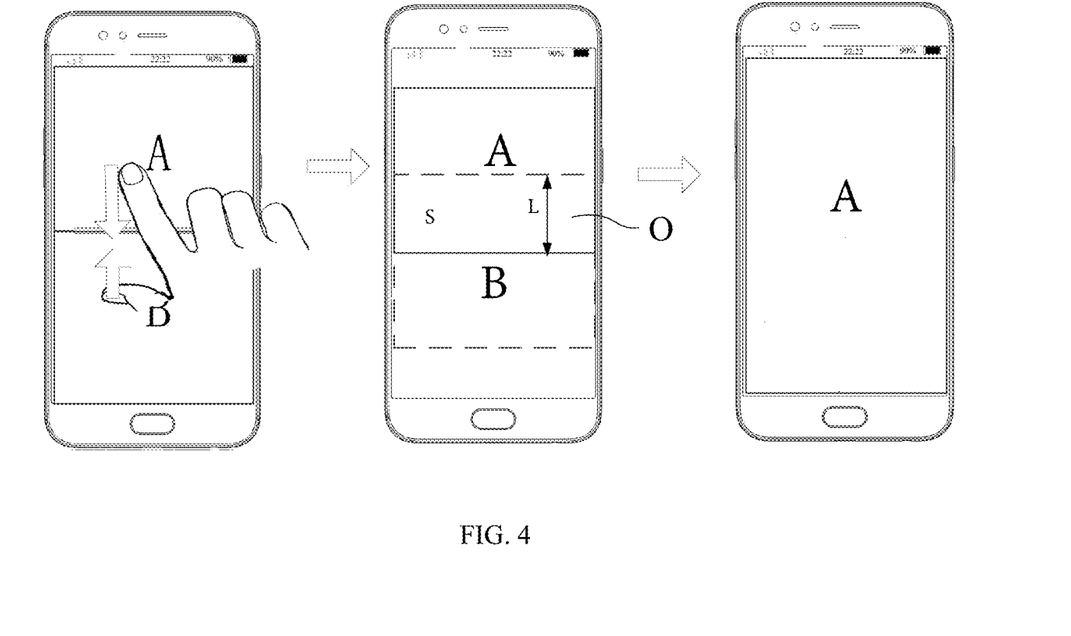
FIG. 4 is a schematic diagram showing a scenario of a split view exiting method, according to an embodiment of the disclosure.

Referring to FIG. 4, when a moving operation, performed by the user on the upper and lower split windows simultaneously, is detected, such as the user uses two fingers to respectively move the upper and lower split windows simultaneously; then the electronic device moves, according to the detected moving operation, the upper and lower split windows simultaneously, such as the upper split window is moved downwards and the lower split window is moved upwards, in other words, the upper and the lower split window are moved towards each other.

Figure 5:
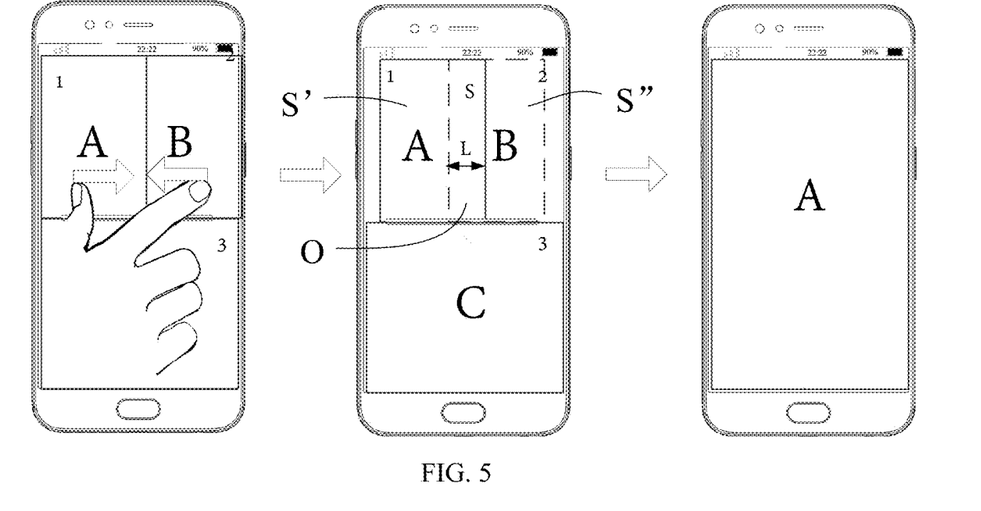
FIG. 5 is a schematic diagram showing a scenario of a split view exiting method, according to another embodiment of the disclosure.

Referring to FIG. 5, when a moving operation, performed on the split windows 1 and 2 simultaneously, is detected, such as the user uses two fingers to respectively move the split windows 1 and 2 simultaneously; then the electronic device moves, according to the detected moving operation, the split windows 1 and 2 simultaneously, such as the split window 1 is moved rightwards and the split window 2 is moved leftwards, in other words, the split windows 1 and 2 are moved towards each other.

103, when detecting that the first and second split windows partially overlap, window overlap information of the first and second split windows is obtained.

Partial overlap of the two split windows refers to that at least a part of one of the two split windows is overlapped or covered with at least a part of the other of the two split windows.

Window overlap information is geometric information configured to describe the partial overlap when the first and second split windows partially overlap. For instance, the window overlap information may include: a window overlap area, a window overlap length, a degree of overlap (partial overlap, complete overlap, and the like), a window area ratio, etc.

The window overlap area is an area of an overlapped portion O when the two split windows overlap. For instance, S illustrated in FIG. 4 is the overlap area of the upper and lower split windows.

The window overlap length is a length of the overlapped portion O when two split windows overlap. For instance, L illustrated in FIG. 4 is the overlap length of the upper and lower split windows.

The window area ratio may be a ratio of the area of the overlapped portion O to the area of any one of the two split windows.

104, it is exited from the split view state, when the window overlap information meets a preset split-screen exit condition.

The preset split-screen exit condition is a preset condition configured for triggering the electronic device to exit the split-screen state or function. The preset condition can be set according to actual needs, for example, can be set based on the window overlap information when the two split-screen windows partially overlap.

For example, when the window overlap information includes the window overlap area, the preset split-screen exit condition may include that the window overlap area is greater than a preset area, or a ratio of the window overlap area to the area of the first split window (or the second split window)) is greater than a preset ratio. That is, the step of "exiting from the split view state, when the window overlap information meets a preset split-screen exit condition" may include: exiting from the split view state, when the window overlap area is greater than the preset area; or exiting from the split view state, when the ratio of the window overlap area to the area of the first split window (or the second split window) is greater than the preset ratio.

For example, referring to FIG. 4, the user moves the upper and lower split windows simultaneously; the overlap area S of the overlapped portion O is obtained when the upper and lower split windows overlap; the split view state is exited when the overlap area S of the overlapped portion O is greater than a preset threshold. For instance, the upper split window remains unchanged and the lower split window is closed when exiting the split view state, as shown in FIG. 4.

For another example, referring to FIG. 5, the user simultaneously moves the split window 1 leftwards and the split window 2 rightwards; the overlap area S of the overlap portion is obtained when the two split windows overlap; the split view state is exited when the overlap area S of the overlapped portion O is greater than the preset threshold. For instance, the split window 2 remains unchanged and the split window 1 is closed when exiting the split view state, as shown in FIG. 5.

In one embodiment, when the window overlap information includes the window overlap length, the preset split-screen exit condition may include that the window overlap length is greater than a preset length, or a ratio of the window overlap length to the length of the first split window (or the second split window) is greater than a preset ratio. That is, the step of "exiting from the split view state, when the window overlap information meets a preset split-screen exit condition" may include:

exiting from the split view state, when the window overlap length is greater than the preset length; or
exiting from the split view state, when the ratio of the window overlap length to the length of the first split window (or the second split window) is greater than the preset ratio.

For example, referring to FIG. 4, the user moves the upper and lower split windows simultaneously; the overlap length L of the overlapped portion O is obtained when the upper and lower split windows overlap; the split view state is exited when the overlap length L of the overlapped portion O is greater than a preset threshold. For instance, the upper split window remains unchanged and the lower split window is closed when exiting the split view state, as shown in FIG. 4.

For another example, referring to FIG. 5, the user simultaneously moves the split window 1 leftwards and the split window 2 rightwards; the overlap length L of the overlapped portion O is obtained when the two split windows overlap; the split view state is exited when the overlap length L of the overlap portion is greater than the preset threshold. For instance, the split window 2 remains unchanged and the split window 1 is closed when exiting the split view state, as shown in FIG. 5.

In one embodiment, when exiting the split view state, it is necessary to determine one or more applications still displayed. For example, the step of "exiting from the split view state" may include:
determining a target application, from a first application displayed on the first split window and a second application displayed on the second split window, wherein the target application remains displayed after exiting the split view state; and
exiting the split view state and displaying the target application.

The target application is the application still displayed when exiting the split function. For instance, if it is necessary to remain the display of the application A when exiting the split function, the application A is the target application.

Referring to FIG. 4 and FIG. 5, the target application can be selected from the application A and the application B respectively displayed on the upper and lower split windows or on the windows 1 and 2. If the application A is selected, the application A is displayed when exiting the split view state.

There may be many manners to determine the target application, and the target application can be determined according to actual conditions. For instance, it can be determined based on the size of the split window. Specifically, the step of "determining a target application, from a first application displayed on the first split window and a second application displayed on the second split window, wherein the target application remains displayed after exiting the split view state" includes:
acquiring the size of the first split window as a first window size and the size of the second split window as a second window size;
selecting, according to the first and the second window size, a target split window from the first and second split windows; and
taking the application displayed on the target split window as the target application that remains displayed after exiting the split view state.

In one embodiment, the application displayed on the split window with a larger or a smaller size could be selected as the target application. Specifically, if the first window size is larger than the second window size, the first split window can be selected as the target split window; if the first window size is less than or equal to the second window size, the second split window can be selected as the target split window.

For example, referring to FIG. 5, the user simultaneously moves the split window 1 leftwards and the split window 2 rightwards, when the two split windows 1 and 2 partially overlap, window overlap information can be acquired. When the window overlap information meets the preset split-screen exit condition, sizes of the split windows 1 and 2 are obtained for comparison, and the one with the larger size is selected from them. Assuming that the size of the split window 1 is larger than the size of the split window 2, then the application A displayed in the split window 1 is determined as the target application, which remains displayed after exiting the split view state. Thus the application A is displayed when exiting the split view state. For instance, the split windows 2 and 3 are closed, and the split window 1 is enlarged according to the size of the screen to realize the display of the application A.

In one embodiment, the target application, which is still displayed after exiting the split view state, also can be determined according to window position information. Specifically, the step of "determining a target application, from a first application displayed on the first split window and a second application displayed on the second split window, wherein the target application remains displayed after exiting the split view state" includes:

acquiring first position information of the first split window and second position information of the second split window;

selecting, according to the first and the second position information, a target split window from the first and second split windows; and taking the application displayed on the target split window as the target application that remains displayed after exiting the split view state.

The window position information is the information about where the split window is displayed on the screen of the electronic device.

In one embodiment, the application displayed on the split window at a specified location could be selected as the target application. That is, it is determined whether the first window position of the first split window or the second window position of the second split window is the specified location. If it is, the application displayed on the first split window or the second split window can be can be taken as the target split application still displayed.

For example, referring to FIG. 5, the user simultaneously moves the split window 1 leftwards and the split window 2 rightwards, when the two split windows 1 and 2 partially overlap, window overlap information can be acquired. When the window overlap information meets the preset split-screen exit condition, positions of the split windows 1 and 2 are obtained. Assuming that the split window located at the upper left corner is selected, then the application A displayed in the split window 1 is determined as the target application, which remains displayed after exiting the split view state. Thus the application A is displayed when exiting the split view state. For instance, the split windows 2 and 3 are closed, and the split window 1 is enlarged according to the size of the screen to realize the display of the application A.

In one embodiment, the target application, which remains displayed, also can be determined according to the area of an unoverlapped portion of the split window. Specifically, the step of "determining a target application, from a first application displayed on the first split window and a second application displayed on the second split window, wherein the target application remains displayed after exiting the split view state" includes:

acquiring the area of the unoverlapped portion of the first split window as a first area, and acquiring the area of the unoverlapped portion of the second split window as a second area;

selecting, according to the first and the second area, a target split window from the first and second split windows; and taking the application displayed on the target split window as the target application that remains displayed after exiting the split view state.

The area of the unoverlapped portion of the split window is the difference of the area of the split window minus the area of the overlapped portion.

In one embodiment, the split window whose area is larger or smaller, could be selected as the target split window. The application displayed on the target split window can be used as the target application that remains displayed after exiting the split view state.

For example, referring to FIG. 5, the user simultaneously moves the split window 1 leftwards and the split window 2 rightwards, when the two split windows 1 and 2 partially overlap, window overlap information can be acquired. When the window overlap information meets the preset split-screen exit condition, unoverlapped portions S' and S" of the split windows 1 and 2 are obtained. The unoverlapped portion S' of the split window 1 is equal to the split window 1 minus the overlapped portion O. The unoverlapped portion S" of the split window 2 is equal to the split window 2 minus the overlapped portion O. Assuming that S' is smaller than S", then the split window 1 can be selected as the target split window, and the application A displayed in the split window 1 is determined as the target application. Thus the application A remains displayed when exiting the split view state. For instance, the split windows 2 and 3 are closed, and the split window 1 is enlarged according to the size of the screen to realize the display of the application A.

It should be understood that although the embodiments of the disclosure describe the method in the case of splitting into two or three split windows in the split view state, the application is not limited to the case of splitting into two display windows, it can also be applied to the case of splitting into more than two display windows, such as four or five display windows. The specific implementation is the same as or similar to the implementation of splitting into two display windows, and it can be referred to the above content and would not be repeated here again.

In the embodiments of the disclosure, the above-mentioned electronic device may be any smart electronic device capable of running application programs, such as a mobile phone, a Tablet Personal Computer, a Laptop Computer, a personal digital assistant (PDA), a Mobile Internet Device (MID), a Wearable Device, etc.

In the application, when it is in the split view state, the moving operation from the user for the first split window and the second split window is detected; the first split window and the second split window are moved according to the detected moving operation; window overlap information of the first split window and the second split window is acquired when detecting that the first split window and the second split window are partially overlapped; it is exited from the split view state when the window overlap information meets a preset split exiting condition. This solution can realize the exiting of the split-screen state according to the user's moving operation performed on the split-screen windows, that is, the exiting of the split-screen state is simplified, and the user does not need to perform cumbersome operations. It is only necessary to move the two split windows to be overlapped, then the split-screen state is exited. As such, the efficiency of exiting the split-screen state is improved. In addition, this solution also provides a number of manners to determine the application still displayed, thereby improving the flexibility of the exiting.

Based on the description of the above embodiment, the split-screen exit method of the application will be further described below.

Figure 6:
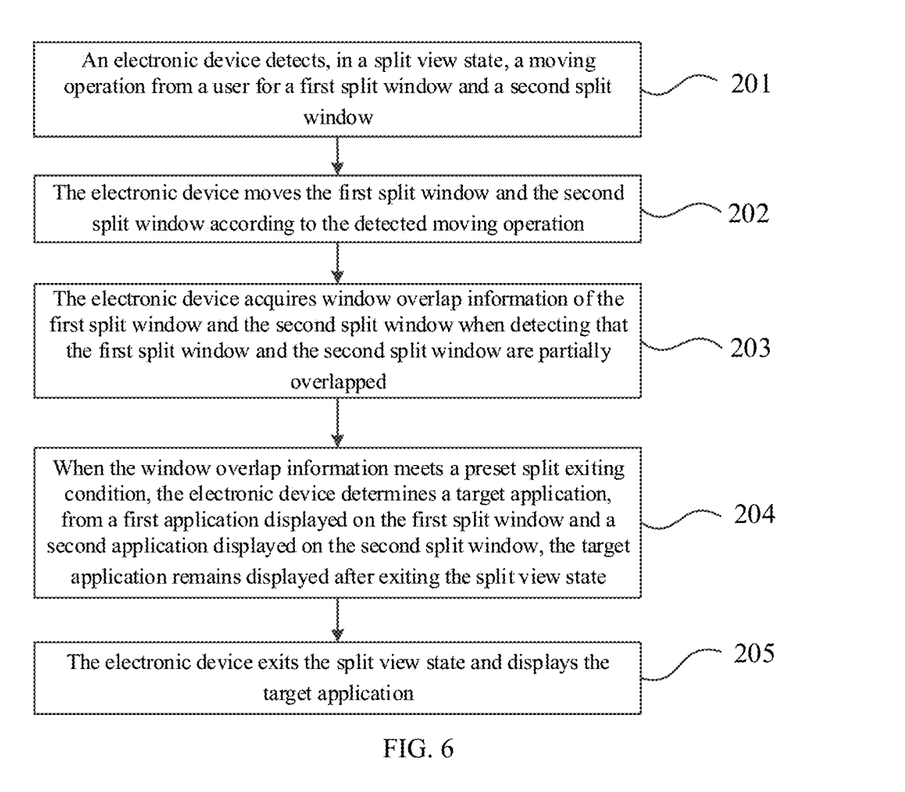
FIG. 6 is a schematic flowchart of a split view exiting method, according to another embodiment of the disclosure.

FIG. 6 illustrates a schematic flowchart of a split view exiting method according to another embodiment of the disclosure. The method includes the following steps.

201, when in a split view state, an electronic device detects a moving operation performed by a user on a first split window and a second split window.

When the electronic device is in the split view state, the electronic device displays a plurality of split windows, such as two, three, or more split windows. The position that each split window displayed on a screen can be set according to actual requirements, and each split window corresponds to one application program (hereinafter application for short).

In the embodiment, the positions of the split windows can be set according to actual needs, e.g., the split windows can be spaced apart from each other.

Figure 7:
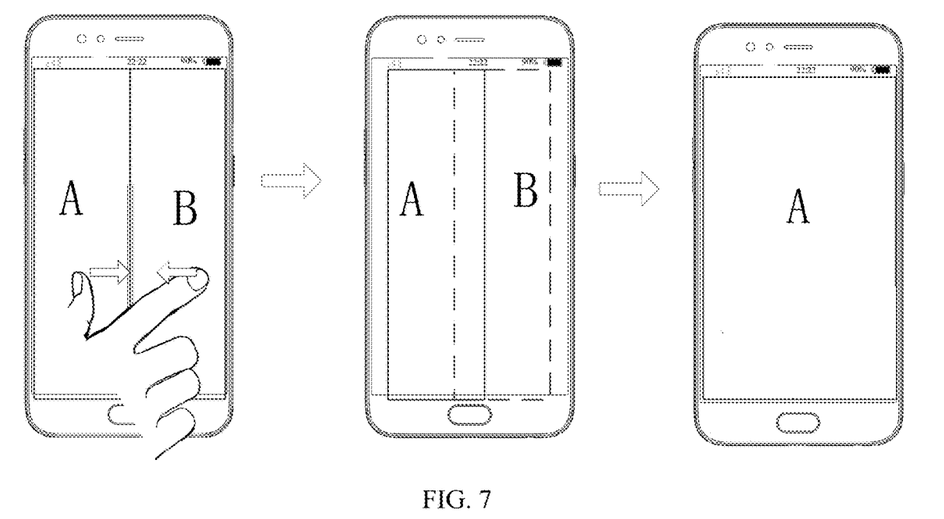
FIG. 7 is a schematic diagram showing a scenario of a split view exiting method, according to still another embodiment of the disclosure.

For example, referring to FIG. 7, when the electronic device is in the split view state, two split windows can be displayed, that is, a left split window and a right split window.

The left split window is configured for displaying an application A, and the right split window is configured for displaying an application B.

The moving operation refers to an operation performed by the user for simultaneously moving both of the two split windows. For instance, the user uses two fingers to move the two split windows at the same time, and the like. The moving operation may include that the two split windows move towards each other.

In one embodiment, the electronic device detects the user's operation performed on the split windows in real time. For instance, the user performs a moving operation on the upper split window and the lower split window at the same time, as shown in FIG. 2. The electronic device detects the moving operation, and can obtain relevant information about the moving operation, such as a moving direction, a moving track, a moving distance, and so on.

202, the electronic device moves the first split window and the second split window, according to the detected moving operation.

For example, the electronic device moves the first split window and the second split window simultaneously, according to the detected moving operation.

Referring to FIG. 7, when it is detected that the user performs a moving operation for both of the left and right split windows, such as the user uses two fingers to respectively move the left and right split windows simultaneously; then the electronic device moves, according to the detected moving operation, the left and right split windows simultaneously, such as the left split window is moved rightwards and the right split window is moved leftwards, in other words, the left and the right split window are moved towards each other.

203, when detecting the first and second split windows partially overlap, the electronic device obtains window overlap information of the first and second split windows.

Partial overlap of the two split windows refers to that at least a part of one of the two split windows is overlapped or covered with at least a part of the other of the two split windows.

Window overlap information is geometric information configured to describe the partial overlap when the first and second split windows partially overlap. For instance, the window overlap information may include: a window overlap area, a window overlap length, a degree of overlap (partial overlap, complete overlap, and the like), a window area ratio, etc.

The window overlap area is an area of an overlapped portion O when the two split windows overlap. For instance, S illustrated in FIG. 4 is the overlap area of the upper and lower split windows.

The window overlap length is a length of the overlapped portion O when two split windows overlap. For instance, L illustrated in FIG. 4 is the overlap length of the upper and lower split windows.

The window area ratio may be a ratio of the area of the overlapped portion O to the area of any one of the two split windows.

204, when the window overlap information meets a preset split-screen exit condition, the electronic device determines, from a first application displayed in the first split window and a second application displayed in the second split window, a target application still displayed after exiting the split-screen state.

The preset split-screen exit condition is a preset condition configured for triggering the electronic device to exit the split-screen state or function. The preset condition can be set according to actual needs, for example, can be set based on the window overlap information when the two split-screen windows partially overlap.

In one embodiment, when the window overlap information includes the window overlap area, the preset split-screen exit condition may include that the window overlap area is greater than a preset area, or a ratio of the window overlap area to the area of the first split window (or the second split window) is greater than a preset ratio.

For example, the electronic device exits from the split view state when the window overlap area is greater than the preset area. Or the electronic device exits from the split view state when the ratio of the window overlap area to the area of the first split window (or the second split window) is greater than the preset ratio.

In one embodiment, when the window overlap information includes the window overlap length, the preset split-screen exit condition may include that the window overlap length is greater than a preset length, or a ratio of the window overlap length to the length of the first split window (or the second split window) is greater than a preset ratio.

For example, the electronic device exits the split view state when the window overlap length is greater than the preset length; or the electronic device exits the split view state when the ratio of the window overlap length to the length of the first split window (or the second split window) is greater than the preset ratio.

For example, referring to FIG. 7, the user moves the left and the right split window simultaneously; the overlap area or the overlap length of the overlapped portion O is obtained when the left and the right split window overlap; the electronic device exits the split view state when the overlap area or the overlap length of the overlapped portion O is greater than a preset threshold. For instance, the left split-screen widow can be retained while the right split window is closed when exiting the split view state, as shown in FIG. 7.

There may be many manners to determine the target application, and the target application can be determined according to actual conditions. For instance, it can be determined based on the size of the split window.

In one embodiment, the electronic device may acquire the size of the first split window as a first window size and the size of the second split window as a second window size; select, according to the first and the second window size, a target split window from the first and second split windows; and use the application displayed on the target split window as the target application still displayed after exiting the split view state.

In one embodiment, the target application, still displayed after exiting the split view state, also can be determined according to window position information. Specifically, the electronic device may acquire first position information of the first split window and second position information of the second split window; select, according to the first and the second position information, a target split window from the first and second split windows; and use the application displayed on the target split window as the target application still displayed after exiting the split view state.

The window position information is the information about where the split window is displayed on the screen of the electronic device.

In one embodiment, the application displayed on the split window at a specified location could be selected as the target application. That is, it is determined whether the first window position of the first split window or the second window position of the second split window is the specified location. If it is, the application displayed on the first split window or the second split window can be taken as the target split application, which will still be displayed.

In one embodiment, the target application still displayed also can be determined according to the area of an unoverlapped portion of the split window. Specifically, the electronic device may acquire the area of the unoverlapped portion of the first split window as a first area, acquire the area of the unoverlapped portion of the second split window as a second area; select, according to the first and the second area, a target split window from the first and second split windows; and use the application displayed on the target split window as the target application, which is still displayed after exiting the split view state.

The area of the unoverlapped portion of the split window is the difference of the area of the split window minus the area of the overlapped portion.

In one embodiment, the split window whose unoverlapped portion has a larger or smaller area, could be selected as the target split window. The application displayed on the target split window can be used as the target application, which is still displayed after exiting the split view state.

For example, the first area and the second area are compared, the application displayed on the second split window is selected as the target application when the first area is larger than the second area, and the application displayed on the first split window is selected as the target application when the first area is less than or equal to the second area.

205, the electronic device exits the split view state and displays the target application.

In one embodiment, the electronic device exits the split view state; enlarges the split window that the current target application is located, according to the size of the screen; and close the other split windows. For instance, the split window, where the current target application is located, is enlarged to be matched with (e.g., the same with) the size of the screen.

For example, the electronic device exits the split view state and displays the application A, as illustrate in FIG. 7.

In the embodiment, the above-mentioned electronic device may be any smart electronic device capable of running application programs, such as a mobile phone, a Tablet Personal Computer, a Laptop Computer, a personal digital assistant (PDA), a Mobile Internet Device (MID), a Wearable Device, etc.

In the disclosure, when it is in the split view state, the moving operation from the user for the first split window and the second split window is detected; the first split window and the second split window are moved according to the detected moving operation; window overlap information of the first split window and the second split window is acquired when detecting that the first split window and the second split window are partially overlapped; it is exited from the split view state when the window overlap information meets a preset split exiting condition. This solution can realize the exiting of the split-screen state according to the user's moving operation performed on the split-screen windows, that is, the exiting of the split-screen state is simplified, and the user does not need to perform cumbersome operations. It is only necessary to move the two split windows to be overlapped, then the split-screen state is exited. As such, the efficiency of exiting the split-screen state is improved. In addition, this solution also provides a number of manners to determine the application still displayed, thereby improving the flexibility of the exiting.

The disclosure further provides a split-screen exiting device. The device includes a detection module, a moving module, an information acquisition module, and an exit processing module.

The detection module is configured to detect, in a split view state, a moving operation from a user for a first split window and a second split window.

The moving module is configured to move the first split window and the second split window according to the detected moving operation.

The information acquisition module is configured to acquire window overlap information of the first split window and the second split window when detecting that the first split window and the second split window are partially overlapped.

The exit processing module is configured to exit the split view state when the window overlap information meets a preset split exiting condition.

In some embodiments, the window overlap information includes a window overlap area.

The exit processing module is configured to exit the split view state when the window overlap area is larger than a preset area.

In some embodiments, the window overlap information includes a window overlap length.

The exit processing module is configured to exit the split view state when the window overlap length is larger than a preset length.

In some embodiments, the window overlap information includes a ratio of the window overlap area to the area of the first split window.

The exit processing module is configured to exit the split view state when the ratio is larger than a preset ratio.

In some embodiments, the exit processing module includes an application determining submodule and an exit display submodule.

The application determining submodule is configured to determine, from a first application displayed on the first split window and a second application displayed on the second split window, a target application still displayed after exiting the split view state.

The exit display submodule is configured to exit the split view state and display the target application.

In some embodiments, the application determining submodule is configured to: acquire the size of the first split window as a first window size and the size of the second split window as a second window size; select, according to the first and the second window size, a target split window from the first and second split windows; and use the application displayed on the target split window as the target application that remains displayed after exiting the split view state.

In some embodiments, the application determining submodule is configured to select the first split window as the target split window when the first window size is larger than the second window size.

In some embodiments, the application determining submodule is configured to: acquire first position information of the first split window and second position information of the second split window; select, according to the first and the second position information, a target split window from the first and second split windows; and use the application displayed on the target split window as the target application that remains displayed after exiting the split view state.

In some embodiments, the application determining submodule is configured to: acquire the area of an unoverlapped portion of the first split window as a first area, acquire the area of an unoverlapped portion of the second split window as a second area; select, according to the first and the second area, a target split window from the first and second split windows; and use the application displayed on the target split window as the target application that remains displayed after exiting the split view state.

In order to facilitate the implementation of the split view exiting method provided in the disclosure, a split-screen exiting device is also provided according to another embodiment of the disclosure. The meaning of the terms used in the embodiment is the same as that of the above-described split view exiting method, and details can refer to the description of the method embodiment.

Figure 8:
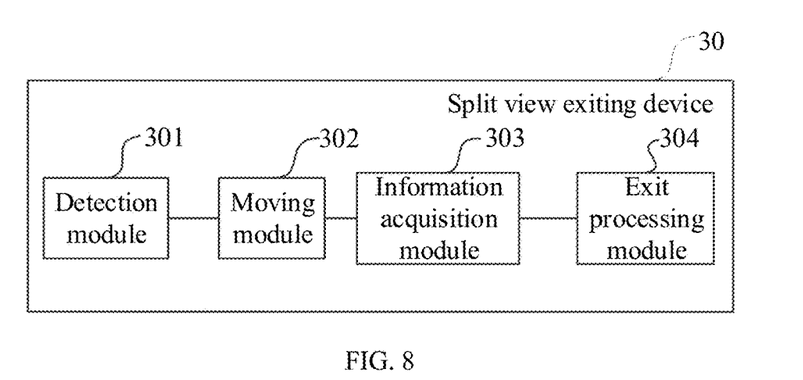
FIG. 8 is a schematic structural diagram of a split view exiting device, according to an embodiment of the disclosure.

FIG. 8 illustrates a split-screen exiting device, according to another embodiment of the disclosure. The split-screen exiting device 30 includes a detection module 301, a moving module 302, an information acquisition module 303, and an exit processing module 304. Details are as follows.

The detection module 301 is configured to detect, in a split view state, a moving operation from a user for a first split window and a second split window.

The moving module 302 is configured to move the first split window and the second split window according to the detected moving operation.

The information acquisition 303 module is configured to acquire window overlap information of the first split window and the second split window when detecting that the first split window and the second split window are partially overlapped.

The exit processing module 304 is configured to exit the split view state when the window overlap information meets a preset split exiting condition.

In one embodiment, the window overlap information includes a window overlap area.

The exit processing module 304 is configured to exit the split view state when the window overlap area is larger than a preset area.

In one embodiment, the window overlap information includes a window overlap length.

The exit processing module 304 is configured to exit the split view state when the window overlap length is larger than a preset length.

Figure 9:
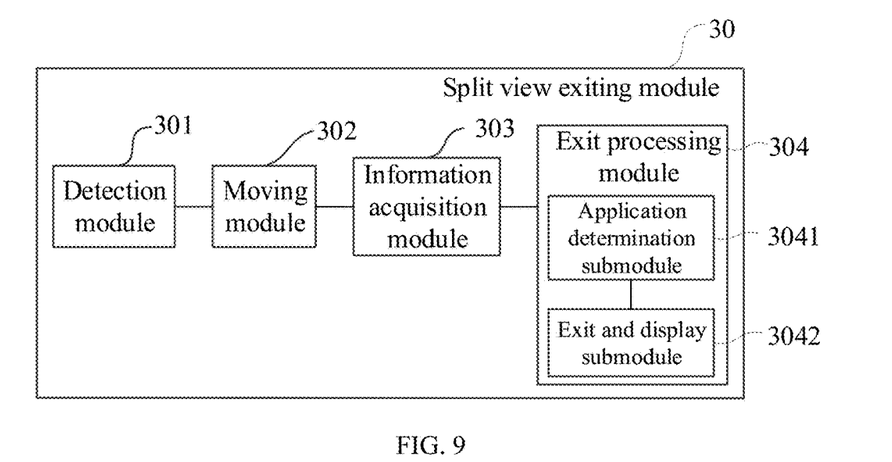
FIG. 9 is a schematic structural diagram of a split view exiting device, according to another embodiment of the disclosure.

In one embodiment, the exit processing module 304 includes an application determining submodule 3041 and an exit display submodule 3042.

The application determining submodule 3041 is configured to determine, from a first application displayed on the first split window and a second application displayed on the second split window, a target application still displayed after exiting the split view state.

The exit display submodule 3042 is configured to exit the split view state and display the target application.

In one embodiment, the application determining submodule 3041 is configured to:

acquire the size of the first split window as a first window size and the size of the second split window as a second window size;

select, according to the first and the second window size, a target split window from the first and second split windows; and use the application displayed on the target split window as the target application that remains displayed after exiting the split view state.

In one embodiment, the application determining submodule 3041 is configured to:

acquire first position information of the first split window and second position information of the second split window;

select, according to the first and the second position information, a target split window from the first and second split windows; and use the application displayed on the target split window as the target application that remains displayed after exiting the split view state.

In one embodiment, the application determining submodule 3041 is configured to:

acquire the area of an unoverlapped portion of the first split window as a first area, acquire the area of an unoverlapped portion of the second split window as a second area;

select, according to the first and the second area, a target split window from the first and second split windows; and use the application displayed on the target split window as the target application that remains displayed after exiting the split view state.

The above modules can be implemented independently or integratedly, as one or more entities. The implementation of each entity can be referred to the previous embodiments.

Based on the above, when the split-screen exiting device 30 of the disclosure is in the split view state, the detection module 301 detects the moving operation from the user for the first split window and the second split window; the moving module 302 moves the first split window and the second split window, according to the detected moving operation; the information acquisition module 303 acquires window overlap information of the first split window and the second split window; the exit processing module 304 is configured to exit the split view state when the window overlap information meets a preset split exiting condition. This solution can realize the exiting of the split-screen state according to the user's moving operation performed on the split-screen windows, that is, the exiting of the split-screen state is simplified, and the user does not need to perform cumbersome operations. It is only necessary to move the two split windows to be overlapped, then the split-screen state is exited. As such, the efficiency of exiting the split-screen state is improved. In addition, this solution also provides a number of manners to determine the application still displayed, thereby improving the flexibility of the exiting.

The disclosure also provides a storage medium, having a computer program stored thereon. When the computer program is executed by a processor, the split view exiting method provided in the method embodiments is implemented.

The disclosure also provides an electronic device, including a memory, a processor, and a computer program stored in the memory and executable by the processor. When the processor executes the computer program, the split view exiting method provided in the method embodiments is implemented.

Figure 10:
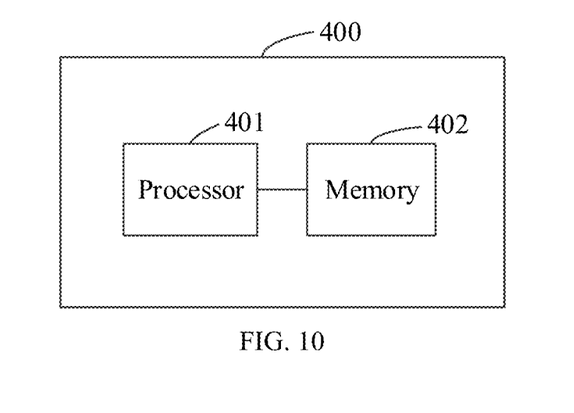
FIG. 10 is a schematic structural diagram of an electronic device, according to an embodiment of the disclosure.

The disclosure further provides an electronic device, according to another embodiment. The electronic device can be a smart phone, a tablet computer, and the like. As shown in FIG. 10, the electronic device 400 includes a processor 401 and a memory 402, and the processor 401 is electrically connected to the memory 402.

The processor 401 is the control center of the electronic device 400, by using various interfaces and lines to connect every part of the electronic device 400. It executes every function and data processing of the electronic device 400 by running or loading application programs stored in the memory 402 and calling data stored in the memory 402, thereby monitoring the electronic device 400.

In this embodiment, the processor 401 of the electronic device 400 may load instructions corresponding to one or more application programs into the memory 402 and run the instructions stored in the memory 402 to achieve various functions, such as steps of:

detecting, in a split view state, a moving operation from a user for a first split window and a second split window; moving the first split window and the second split window according to the detected moving operation; acquiring window overlap information of the first split window and the second split window when detecting that the first split window and the second split window are partially overlapped; and exiting the split view state when the window overlap information meets a preset split exiting condition.

Figure 11:
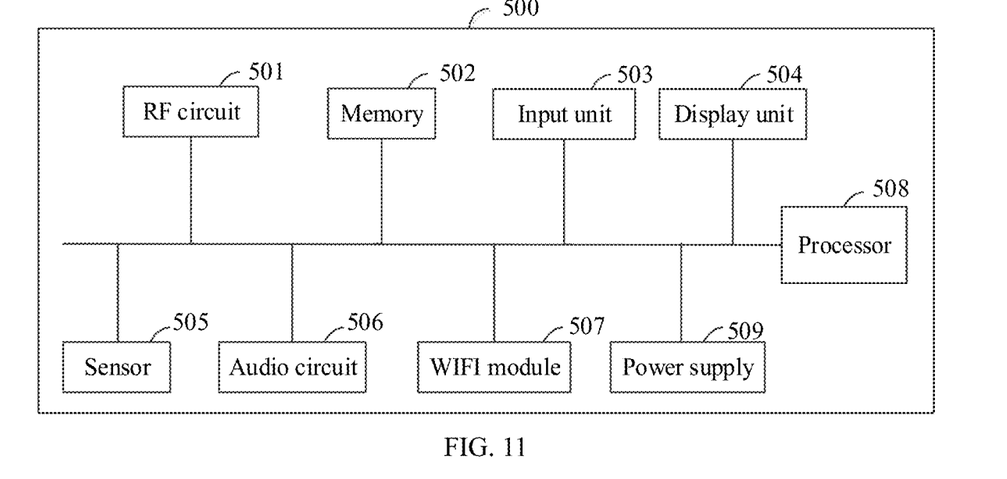
FIG. 11 is a schematic structural diagram of an electronic device, according to another embodiment of the disclosure.

FIG. 11 illustrates a schematic structural diagram of an electronic device, according to an embodiment of the disclosure. The electronic device 500 includes a radio frequency (RF) circuit 501, a memory 502 having one or more computer readable storage media, an input unit 503, a display unit 504, a sensor 505, an audio circuit 506, a wireless fidelity (WiFi) module 507, a processor 508 having one or more processing cores, and a power supply 509 and the like. It will be understood by those skilled in the art that the structure of the electronic device as shown in FIG. 11 does not constitute a limitation to the electronic device, and the electronic device may include more or less components than those illustrated, or a combination of certain components, or different component arrangements.

The RF circuit 501 can be used for transmitting and receiving messages, or transmitting and receiving signals during a call. Specifically, after receiving downlink information of a base station, the downlink information is processed by one or more processors 508. In addition, the data related to the uplink is sent to the base station. Generally, the RF circuit 501 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 501 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 502 can be used to store software programs and modules, and the processor 508 executes various functional applications and processing data by running software programs and modules stored in the memory 502. The memory 502 may mainly include a storage program area and a storage data area, wherein the storage program area may store an operating system, applications required for at least one function (such as a sound playing function, an image playing function, etc.), and the like. The storage data area may store the data created by the use of the electronic device (such as audio data, phone book, etc.). Moreover, the memory 502 can include high speed random access memory, and can also include non-volatile memory, such as at least one magnetic disk storage device, flash memory device, or other volatile solid state storage device. Accordingly, the memory 502 may also include a memory controller to provide the access to the memory 502 by the processor 508 and the input unit 503.

The input unit 503 can be used to receive input numeric, character, or user characteristic information, as well as to generate signal inputs related to user settings and function controls, via a keyboard, a mouse, a joystick, optics or a trackball. In particular, in one particular embodiment, the input unit 503 can include a touch-sensitive surface as well as other input devices. The touch-sensitive surface, also known as touch screens or trackpads, collects touch operations on or near it by a user (such as the user using a finger, stylus, etc., any suitable object or accessory operates on the touch-sensitive surface or near the touch-sensitive surface), and drives the corresponding connecting device according to a preset program. Alternatively, the touch sensitive surface may include two parts of a touch detection device and a touch controller. Wherein, the touch detection device detects the touch orientation of the user, detects a signal brought by the touch operation, transmits the signal to the touch controller; the touch controller receives the touch information from the touch detection device, converts the touch information into contact coordinates, and sends the touch information to the processor 508, and can receive commands from the processor 508 and execute them.

The display unit 504 can be used to display information input by the user or information provided to the user, as well as various graphical user interfaces of the electronic device, which can be composed of graphics, text, icons, videos, and any combination thereof. The display unit 504 can include a display panel. Alternatively, the display panel can be configured in the form of a Liquid Crystal Display (LCD), an Organic Light-Emitting Diode (OLED), or the like. Further, the touch-sensitive surface can cover the display panel, and when the touch-sensitive surface detects a touch operation thereon or nearby, it is transmitted to the processor 508 to determine the type of the touch event, and then the processor 508 provides a visible output to the display panel according to the type of the touch event. Although in FIG. 8, the touch-sensitive surface and display panel are implemented as two separate components to perform input and output functions, in some embodiments, the touch-sensitive surface can be integrated with the display panel to implement input and output functions.

The electronic device also can include at least one type of the sensor 505, such as a light sensor, a motion sensor, and other sensors. Specifically, the light sensor may include an ambient light sensor and a proximity sensor, wherein the ambient light sensor may adjust the brightness of the display panel according to the brightness of the ambient light, and the proximity sensor may close the display panel and/or the backlight when the electronic device moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the electronic device and are not detailed here.

The audio circuit 506, a speaker, and a microphone can provide an audio interface between the user and the electronic device. The audio circuit 506 can convert the received audio data into electrical signals and transmit the electrical signals to the speaker, the speaker converts the electrical signals into sound signals and output the sound signals. On the other hand, the microphone converts the collected sound signals into electrical signals, the electrical signals are received by the audio circuit 506 and then converted into audio data, the audio data is then processed by the processor 508, and then is sent to another electronic device via the RF circuitry 501, for example, or the audio data is output to memory 502 for further processing. The audio circuit 506 may also include an earbud jack to provide communication between the peripheral earphone and the electronic device.

WiFi is a short-range wireless transmission technology, and the electronic device can help users to send and receive emails, browse web pages, and access streaming media through the WiFi module 507, which provides wireless broadband internet access for users. Although FIG. 11 shows the WiFi module 507, it can be understood that it is not the necessary configuration of the electronic device, and may be omitted as needed within the scope of not changing the essence of the disclosure.

The processor 508 is the control center of the electronic device, which connects various portions of the entire electronic device using various interfaces and lines, by performing or executing software programs and/or modules stored in the memory 502, and by invoking data stored in the memory 502, thereby implementing the various functions of the electronic device and processing data to monitor the electronic device. Optionally, the processor 508 may include one or more processing cores. Optionally, the processor 508 may integrate an application processor and a modem processor, where the application processor mainly processes the operating system, the user interfaces, the applications, and the like, and the modem processor primarily handles wireless communications. It will be appreciated that the above described modem processor may also not be integrated into the processor 508.

The electronic device 500 also includes the power supply 509 (such as a battery) that supplies power to the various components. Optionally, the power supply 509 can be logically coupled to the processor 508 through a power management system to manage functions such as charging, discharging, and power management through the power management system. The power supply 509 may also include one or more of DC or AC power source, a recharging system, a power failure detection circuit, a power converter or inverter, a power status indicator, and the like.

Although not shown in FIG. 11, the electronic device may further include a camera, a Bluetooth module, and the like, and details are not described herein again.

The above modules can be implemented independently or integratedly, as one or more entities. The implementation of each entity can be referred to the previous embodiments.

Those skilled in the art can understand that all or part of the steps of the foregoing embodiments can be performed by a program to instruct related hardware, and the program can be stored in a computer readable memory such as a memory of a terminal, and is executed by a processor of the terminal. The executing may includes the processes of the split view exiting method. The memory may include a read only memory (ROM), a random access memory (RAM), a disk, a CD and the like.

The split view exiting method and device, the storage medium, and the electronic device provided by the embodiments of the disclosure, are described in detail above. In the split-screen exiting device and the electronic device, functional modules can be integrated into one processing chip, or each module can exist separately or physically, or two or more modules may be integrated into one. The above-mentioned integrated modules can be implemented in the form of hardware or in the form of software functional modules. Specific examples are used in this article to illustrate the principle and implementation of the disclosure, and the description of the above examples is only used to help understand the disclosure. Meanwhile, for those skilled in the art, according to the spirit of the application, there will be changes in the specific implementation and the scope of disclosure. In summary, the content of this specification should not be construed as a limitation to the disclosure.

What is claimed is:

1. A split view exiting method, comprising:
   detecting, in a split view state, a moving operation simultaneously performed on a first split window and a second split window, wherein the moving operation is configured to cause the first split window and the second split window to move toward each other;
   moving simultaneously the first split window and the second split window toward each other according to the detected moving operation, wherein a first window size of the first split window and a second window size of the second split window are unchanged during the moving;
   acquiring window overlap information of the first split window and the second split window when detecting that the first split window and the second split window are partially overlapped;
   in response to the window overlap information meeting a preset split exiting condition, selecting, based on the first window size of the first split window and the second window size of the second split window that are unchanged during the moving, a target split window from the first split window and the second split window;
   taking an application displayed on the target split window as a target application, wherein the target application remains displayed after exiting of the split view state; and
   exiting the split view state to display the target application in fullscreen;

wherein an operation of selecting, based on the first window size of the first split window and the second window size of the second split window that are unchanged during the moving, a target split window from the first split window and the second split window, comprises:

selecting the first split window as the target split window, in response to the first window size of the first split window that is unchanged during the moving being greater than the second window size of the second split window that is unchanged during the moving.

2. The method of claim 1, wherein the window overlap information comprises a window overlap area, and the window overlap information meeting a preset split exiting condition comprises:

the window overlap area is greater than an area threshold.

3. The method of claim 1, wherein the window overlap information comprises a window overlap length, and the window overlap information meeting a preset split exiting condition comprises:

the window overlap length is greater than a length threshold.

4. The method of claim 1, wherein the window overlap information comprises an area ratio of a window overlap area to an area of the first split window, and the window overlap information meeting a preset split exiting condition comprises:

the area ratio is greater than a ratio threshold.

5. The method of claim 1, wherein an operation of acquiring window overlap information of the first split window and the second split window when detecting that the first split window and the second split window are partially overlapped comprises:

detecting an overlapped portion formed by moving the first split window and the second split window;

updating a size of the overlapped portion until the size of the overlapped portion remains unchanged within a preset time length; and taking a latest updated size of the overlapped portion as the window overlap information.

6. The method of claim 5, wherein the overlapped portion is formed when at least a part of the first split window is overlapped with at least a part of the second split window.

7. The method of claim 1, after an operation of moving simultaneously the first split window and the second split window toward each other according to the detected moving operation, the method further comprising:

detecting an overlapped portion formed by moving the first split window and the second split window;

wherein the window overlap information comprises an area of the overlapped portion, a length of the overlapped portion, and a ratio of the area of the overlapped portion to an area of the first split window; and wherein the window overlap information meeting a preset split exiting condition comprises:

any one of the area of the overlapped portion, the length of the overlapped portion, and the ratio of the area of the overlapped portion to the area of the first split window is greater than a corresponding threshold.

8. The method of claim 1, wherein an operation of exiting the split view state to display the target application in fullscreen comprises:

determining the target split window from the first and second split windows;

closing an other of the first split window and the second split window that is different from the target application windows;

enlarging the target split window until the target split window is fullscreen; and displaying the target application in the enlarged target split window.

9. The method of claim 1, after an operation of moving simultaneously the first split window and the second split window toward each other according to the detected moving operation, the method further comprising:

detecting an overlapped portion formed by moving the first split window and the second split window;

acquiring and updating a size of the overlapped portion as the first split window and the second split window move;

acquiring and updating a size of an unoverlapped portion of the first split window as the first split window and the second split window move; and acquiring and updating a size of an unoverlapped portion of the second split window as the first split window and the second split window move;

wherein the window overlap information meeting a preset split exiting condition comprises:

a latest updated size of the overlapped portion is greater than a size threshold and a latest updated size of the unoverlapped portion of the first split window is greater than a latest updated size of the unoverlapped portion of the second split window.

10. The method of claim 1, before an operation of detecting, in a split view state, a moving operation simultaneously performed on a first split window and a second split window, the method further comprising:

displaying the first split window, the second split window and a third split window on a screen, wherein the first split window, the second split window and the third split window are adjacent;

wherein an operation of exiting the split view state comprises:

closing the second split window and the third split window; and enlarging the first split window until the first split window is fullscreen.

11. An electronic device, comprising a memory, a processor, and a computer program stored in the memory and executable by the processor, a split view exiting method being implemented when the processor executes the computer program, the split view exiting method comprising:

detecting, in a split view state, a moving operation simultaneously performed on a first split window and a second split window, wherein the moving operation is configured to cause the first split window and the second split window to move toward each other;

moving simultaneously the first split window and the second split window toward each other according to the detected moving operation, wherein a first window size of the first split window and a second window size of the second split window are unchanged during the moving;

determining an overlapped portion formed by moving the first split window and the second split window;

acquiring window overlap information of the first split window and the second split window based on a size of the overlapped portion;

in response to the window overlap information meeting a preset split exiting condition, selecting, based on the first window size of the first split window and the second window size of the second split window that are unchanged during the moving, a target split window from the first split window and the second split window;

taking an application displayed on the target split window as a target application, wherein the target application remains displayed after exiting of the split view state; and exiting the split view state to display the target application in fullscreen;

wherein the first split window is selected as the target split window, in response to the first window size of the first split window that is unchanged during the moving being greater than the second window size of the second split window that is unchanged during the moving.

12. The electronic device of claim 11, wherein the window overlap information meeting a preset split exiting condition comprises:

any one of an area of the overlapped portion, a length of the overlapped portion, and a ratio of the area of the overlapped portion to an area of the first split window is greater than a corresponding threshold.

13. The electronic device of claim 11, wherein the exiting the split view state to display the target application in fullscreen, comprises:

selecting, based on first position information of the first split window and second position information of the second split window, the target split window from the first split window and the second split window;

taking an application displayed on the target split window as the target application, wherein the target application remains displayed after the exiting of the split view state;

closing another one of the first split window and the second split window that is different from the target split window; and enlarging the target split window to be fullscreen and displaying the target application in the enlarged target split window.

14. The electronic device of claim 13, wherein the selecting, based on first position information of the first split window and second position information of the second split window, the target split window from the first split window and the second split window, comprises:

determining, based on first position information of the first split window and second position information of the second split window, one of the first split window and the second split window that is located at a specified location; and selecting, as the target split window, the determined split window located at the specified location.

15. A split view exiting method, comprising:

detecting, in a split view state, a moving operation simultaneously performed on a first split window and a second split window, wherein the moving operation is configured to cause the first split window and the second split window to move toward each other;

moving simultaneously the first split window and the second split window toward each other according to the detected moving operation, wherein a first window size of the first split window and a second window size of the second split window are unchanged during the moving;

acquiring window overlap information of the first split window and the second split window when detecting that the first split window and the second split window are partially overlapped;

in response to the window overlap information meeting a preset split exiting condition, selecting, based on a first area of an unoverlapped portion of the first split window and a second area of an unoverlapped portion of the second split window, a target split window from the first split window and the second split window, wherein the first area is determined based on an area of an overlapped portion between the first split window and the second split window and the first window size of the first split window that is unchanged during the moving, and the second area is determined based on the area of the overlapped portion and the second window size of the second split window that is unchanged during the moving;

taking an application displayed on the target split window as a target application, wherein the target application remains displayed after exiting of the split view state; and exiting the split view state to display the target application in fullscreen;

wherein the first split window is selected as the target split window, in response to the first window size of the first split window that is unchanged during the moving being greater than the second window size of the second split window that is unchanged during the moving.

16. The method of claim 15, wherein the window overlap information meeting a preset split exiting condition, comprises:

any one of the area of the overlapped portion, a length of the overlapped portion, and a ratio of the area of the overlapped portion to an area of the first split window is greater than a corresponding threshold.

17. The method of claim 15, wherein the acquiring window overlap information of the first split window and the second split window when detecting that the first split window and the second split window are partially overlapped comprises:

detecting the overlapped portion formed by moving the first split window and the second split window;

updating a size of the overlapped portion until the size of the overlapped portion remains unchanged within a preset time length; and taking a latest updated size of the overlapped portion as the window overlap information.

18. The method of claim 15, wherein the selecting, based on a first area of an unoverlapped portion of the first split window and a second area of an unoverlapped portion of the second split window, a target split window from the first split window and the second split window, comprises:

comparing a first area of an unoverlapped portion of the first split window and a second area of an unoverlapped portion of the second split window, to obtain a larger one of the first area and the second area; and selecting, as the target split window, one split window from the first split window and the second split window, the selected one split window corresponding to the larger one of the first area and the second area.

19. The method of claim 15, wherein the selecting, based on a first area of an unoverlapped portion of the first split window and a second area of an unoverlapped portion of the second split window, a target split window from the first split window and the second split window, comprises:

comparing a first area of an unoverlapped portion of the first split window and a second area of an unoverlapped portion of the second split window, to obtain a smaller one of the first area and the second area; and selecting, as the target split window, one split window from the first split window and the second split window, the selected one split window corresponding to the smaller one of the first area and the second area.

* * * * *